United States Patent
Chen et al.

(10) Patent No.: US 6,185,051 B1
(45) Date of Patent: Feb. 6, 2001

(54) HIGH NUMERICAL APERTURE OPTICAL FOCUSING DEVICE FOR USE IN DATA STORAGE SYSTEMS

(75) Inventors: Hong Chen, San Jose; Chuan He, Fremont; Charles C. K. Cheng, Cupertino; Joseph J. Miceli, Jr., Saratoga, all of CA (US)

(73) Assignee: Read-Rite Corporation, Fremont, CA (US)

( * ) Notice: Under 35 U.S.C. 154(b), the term of this patent shall be extended for 0 days.

(21) Appl. No.: 09/338,785

(22) Filed: Jun. 23, 1999

(51) Int. Cl.[7] ............................ G02B 13/18; G02B 17/00; G11B 13/00; G11B 11/00; G11B 7/00
(52) U.S. Cl. .......................... 359/709; 359/364; 359/719; 359/727; 369/13; 369/14; 369/112
(58) Field of Search ..................................... 359/708, 709, 359/712, 726, 727, 813, 719, 364; 369/13, 14, 112

(56) References Cited

U.S. PATENT DOCUMENTS

| | | | |
|---|---|---|---|
| 3,999,855 | * 12/1976 | Hirschfeld | 356/338 |
| 5,042,928 | 8/1991 | Richards | 359/728 |
| 5,125,750 | 6/1992 | Corle et al. | 350/819 |
| 5,285,318 | * 2/1994 | Gleckman | 359/709 |
| 5,497,359 | 3/1996 | Mamin et al. | 369/44 |
| 5,689,480 | 11/1997 | Kino | 369/14 |
| 5,986,995 | * 11/1999 | He et al. | 369/112 |

FOREIGN PATENT DOCUMENTS 758753   2/1996   (EP) .

OTHER PUBLICATIONS

Lee, C.W., et al., "Feasibility Study on Near Field Optical Memory Using A Catadioptric Optical System", Optical Data Storage, Technical Digest Series, vol. 8, pp. 137–139, May 10–13, 1998.

Mansipur, M. et al. "Parallel Processing", 42 Optics and Photonics News, pp. 42–45, Jun. 1998.

* cited by examiner

Primary Examiner—Georgia Epps
Assistant Examiner—David N. Spector
(74) Attorney, Agent, or Firm—Samuel A. Kassatly

(57) ABSTRACT

A near-field optical or MO data storage system uses an optical focusing device for focusing an incident optical beam to a small size focal spot. The optical focusing device includes an optically transmissive body which is defined by a generally flat incident surface, a flat, bottom surface disposed opposite and parallel to the incident surface, and a reflective side coated with a reflective layer for reflecting the optical beam through the body toward the bottom surface. The bottom surface defines a focal plane on which the focal spot is formed, for generating a localized evanescent field. The focal spot is located along a central axis P, in very close proximity to the data storage disk, such that the localized evanescent field interacts with the disk, for enabling data to be transduced to and from the disk by effecting near field coupling. An electro-magnetic coil or coil assembly, can optionally be formed on the bottom surface, co-axially with the focal spot, for generating a desired write magnetic field. The reflective side of the optical focusing device preferably has a parabola shaped curvature, but other shapes can alternatively be selected. For example, the side curvature can have a tilted parabola shape.

25 Claims, 8 Drawing Sheets

HIGH NUMERICAL APERTURE OPTICAL FOCUSING DEVICE FOR USE IN DATA STORAGE SYSTEMS

CROSS-REFERENCE TO RELATED APPLICATIONS

This application relates to co-pending U.S. patent applications Ser. No. 09/179,279, titled "High Numerical Aperture Optical Focusing Device Having A Conical Incident Facet And A Parabolic Reflector For Use In Data Storage Systems", and Ser. No. 09/179,278, titled "High Numerical Aperture Optical Focusing Device For Use In Data Storage Systems", both of which are assigned to the same assignee as the present invention.

BACKGROUND OF THE INVENTION

1. Field of the Invention

The present invention relates in general to optical focusing devices, and it particularly relates to a high numerical aperture (NA) optical focusing device. More particularly, the present invention relates to an optical focusing device comprising a parabolic reflective surface or a combination of optical surfaces, for generating an evanescent optical field that enables its use in data storage systems such as optical and magneto-optical (MO) disk drives.

2. Description of Related Art

In a MO storage system, a thin film read/write head includes an optical assembly for directing and focusing an optical beam, such as a laser beam, and an electro-magnetic coil that generates a magnetic field for defining the magnetic domains in a spinning data storage medium or disk. The head is secured to a rotary actuator magnet and a voice coil assembly by a suspension and an actuator arm positioned over a surface of the disk. In operation, a lift force is generated by the aerodynamic interaction between the head and the disk. The lift force is opposed by equal and opposite spring forces applied by the suspension such that a predetermined flying height is maintained over a full radial stroke of the rotary actuator assembly above the surface of the disk.

A significant concern with the design of the MO head is to increase the recording or areal density of the disk. One attempt to achieve objective has been to reduce the spot size of the light beam on the disk. The diameter of the spot size is inversely proportional to the numerical aperture (NA) of an objective lens forming part of the optical assembly, and proportional to the wavelength of the optical beam. As a result, the objective lens is selected to have a large NA. However, the NA in objective lenses cannot be greater than 1 if the focusing spot is located in free space, thus limiting the spot size.

Another attempt to reduce the spot size and to increase the recording areal density has been to use solid immersion lenses (SILs) with near field recording, as exemplified by the following references:

U.S. Pat. No. 5,125,750, titled "Optical Recording System Employing a Solid Immersion Lens".

U.S. Pat. No. 5,497,359, titled "Optical Disk Data Storage System With Radiation-Transparent Air-Bearing Slider".

Yet another attempt at improving the recording head performance proposes the use of near-field optics, as illustrated by the following reference:

U.S. Pat. No. 5,689,480, titled "Magneto-Optic Recording System Employing Near Field Optics".

A catadioptric SIL system is described in the following references, and employs the SIL concept as part of the near-field optics:

Lee, C. W., et al., "Feasibility Study on Near Field Optical Memory Using A Catadioptric Optical System", Optical Data Storage, Technical Digest Series, Volume 8, pages 137–139, May 10–13, 1998; and "Parallel Processing", 42 Optics and Photonics News, pages 42–45, June 1998.

While this catadioptric SIL system can present certain advantages over conventional SILs, it does not appear to capture the entire incident, collimated beam. This represents a waste of valuable energy that could otherwise increase the evanescent optical field.

Other concerns related to the manufacture of MO heads are the extreme difficulty and high costs associated with the mass production of these heads, particularly where optical and electromagnetic components are assembled to a slider body, and aligned for optimal performance.

SUMMARY OF THE INVENTION

One aspect of the present invention is to satisfy the long felt, and still unsatisfied need for a near-field optical or MO data storage system that uses an optical focusing device for focusing an incident optical beam to a small size focal spot.

According to one embodiment of the present invention, the optical focusing device includes an optically transmissive body which is defined by a generally flat incident surface, a flat, bottom surface disposed opposite and parallel to the incident surface, and a reflective side coated with a reflective layer for reflecting the optical beam through the body toward the bottom surface. The bottom surface defines a focal plane on which the focal spot is formed, for generating a localized evanescent field.

The focal spot is located along a central axis P, in very close proximity to the data storage disk, such that the localized evanescent field interacts with a recording medium of the disk, for enabling data to be transduced to and from the disk by effecting near field coupling. An electromagnetic coil or coil assembly, can optionally be formed on the bottom surface, co-axially with the focal spot, for generating a desired write magnetic field.

The reflective side of the optical focusing device preferably has a parabola shaped curvature, but other shapes can alternatively be selected. For example, the side curvature can have a tilted parabola shape.

According to another embodiment, the optical focusing device further includes an optically transmissive, complementary conical element with a generally flat incident surface and a conical exit surface. The complementary conical element is also comprised of a cylindrical side having a circular cross-section.

According to still another embodiment, the focusing device further includes a second complementary conical element which is disposed intermediate the body of the main focusing element and the complementary conical element. The second complementary conical element is optically transmissive and includes an incident conical surface, and a flat exit surface, such that the conical exit surface of the complementary conical element and the incident conical surface of the second complementary conical element can be fitted together to form a cylindrical axicon According to yet another embodiment, the focusing device includes a conical element and a complementary element having an optically transmissive body. The body is defined by a conically shaped incident surface, a flat bottom surface disposed opposite to the incident surface, a cylindrical side with a circular cross-section, a reflective side coated with a reflective layer for reflecting the optical beam through the body toward the bottom surface, such that the bottom surface defines a focal plane on which the focal spot is formed, for generating an evanescent field.

According to another embodiment, the focusing device includes an optically transmissive body defined by an incident conical surface, a generally flat bottom surface disposed opposite to the incident surface, a reflective side for reflecting the optical beam through the body toward the bottom surface. In a variation to this embodiment, the focusing device further includes a cylindrical side with a circular cross-section.

Another aspect of the present invention is the ability to mass-produce the optical devices at wafer level. The manufacturing method includes forming a plurality of substantially identical lens plates on an optical wafer wherein each lens plate contains at least one focusing device. The lens plates are formed by etching a plurality of openings in the optical wafer, such that each opening extends through the entire height of the optical wafer and corresponds to one optical device. Each opening is contoured by a wall having the shape of the reflective side. The openings are then filled with an optical material, and the top and bottom surfaces of the optical wafer are then lapped to a desired height. The individual lens plates are sliced along cutting lines.

BRIEF DESCRIPTION OF THE DRAWINGS

The features of the present invention and the manner of attaining them will become apparent, and the invention itself will be understood by reference to the following description and the accompanying drawings, wherein.

Similar numerals in the drawings refer to similar or identical elements. It should be understood that the sizes of the different components in the figures might not be in exact proportion, and are shown for visual clarity and for the purpose of explanation.

DETAILED DESCRIPTION OF THE INVENTION

Figure 1:
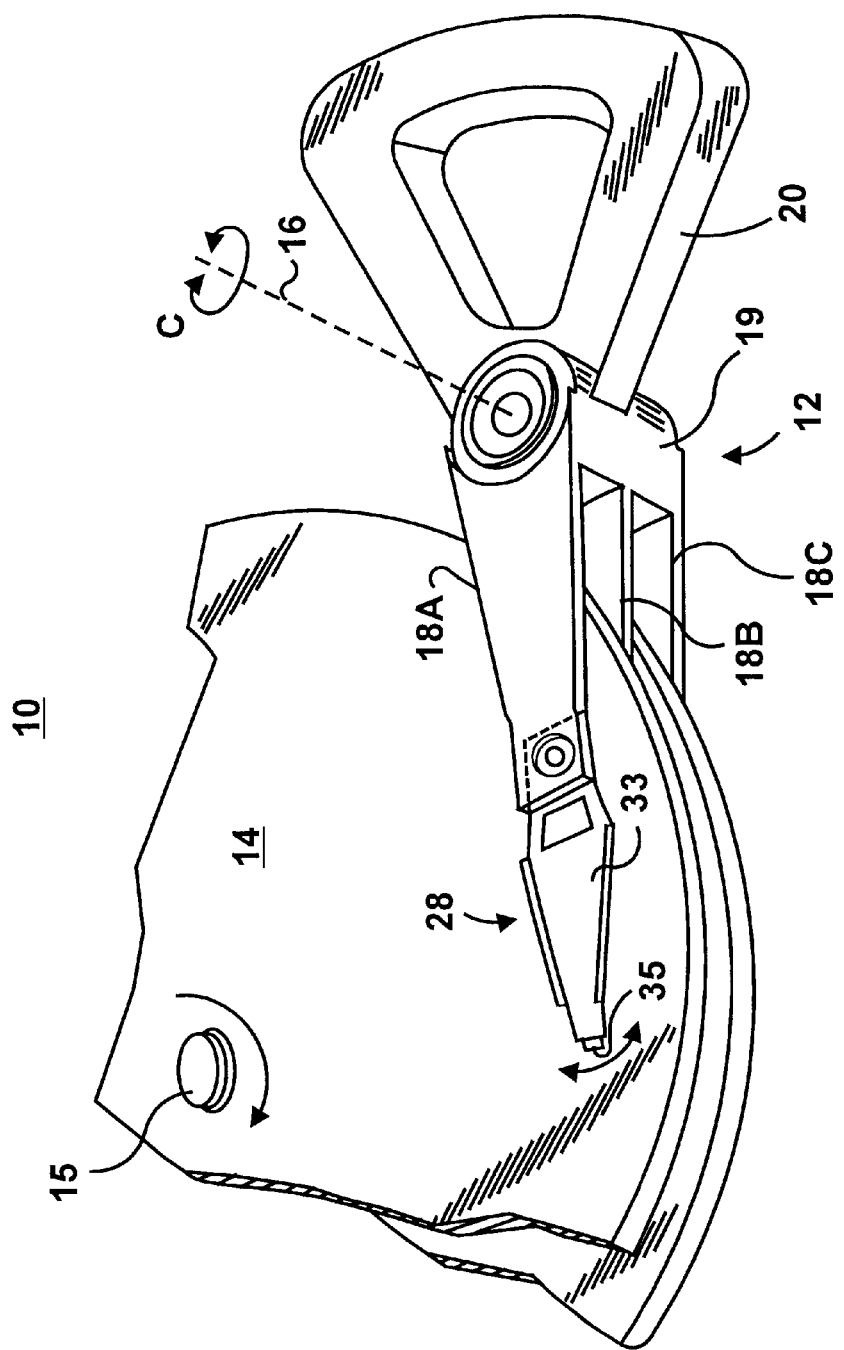
FIG. 1 is a fragmentary perspective view of a data storage system utilizing a read/write head comprised of an optical focusing device according to the present invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
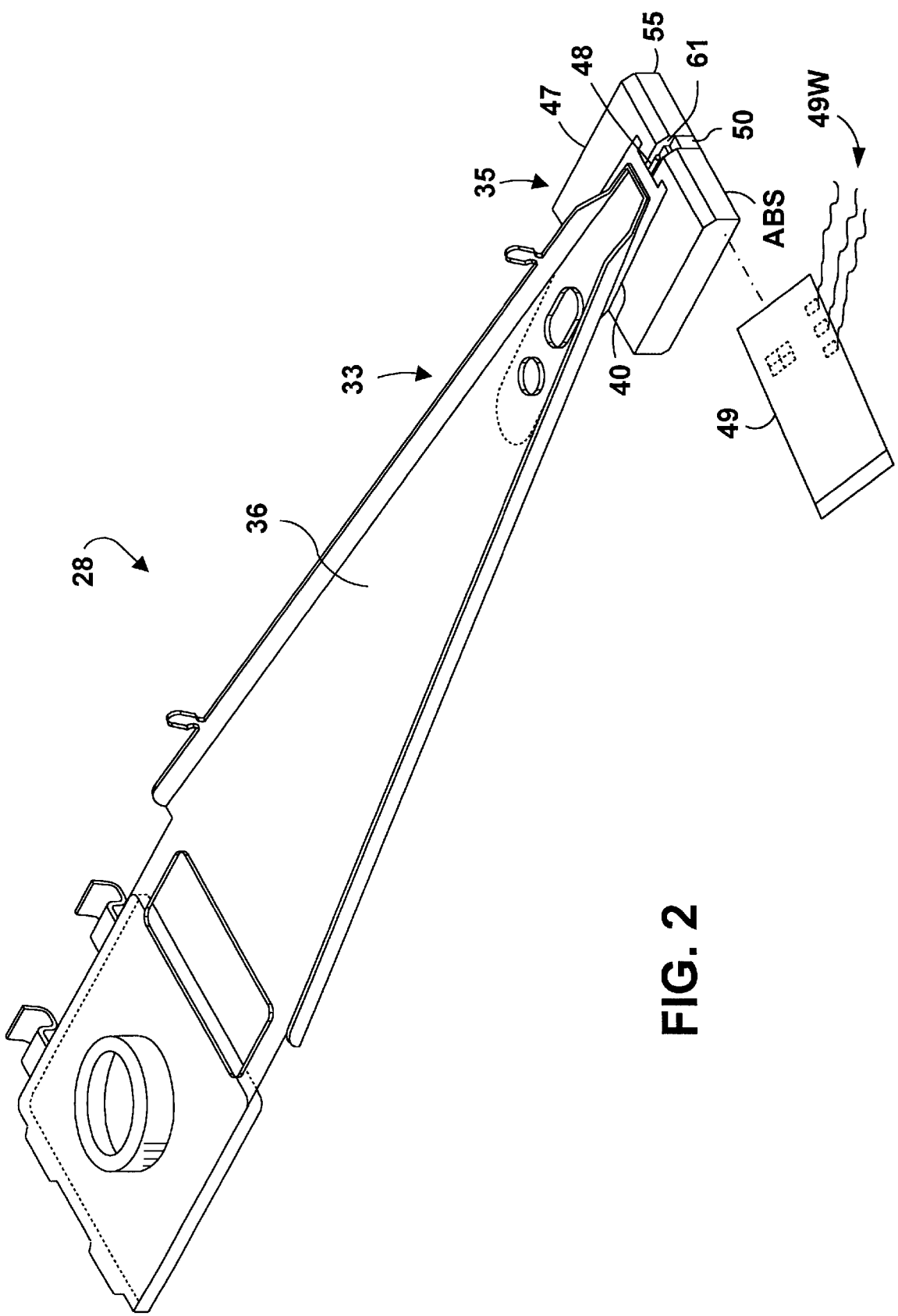
FIG. 2 is a perspective view of a head gimbal assembly comprised of a suspension and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write head 35. The suspension 33 includes a resilient load beam 36 and a flexure 40 to which the head 35 is secured.

Figure 3:
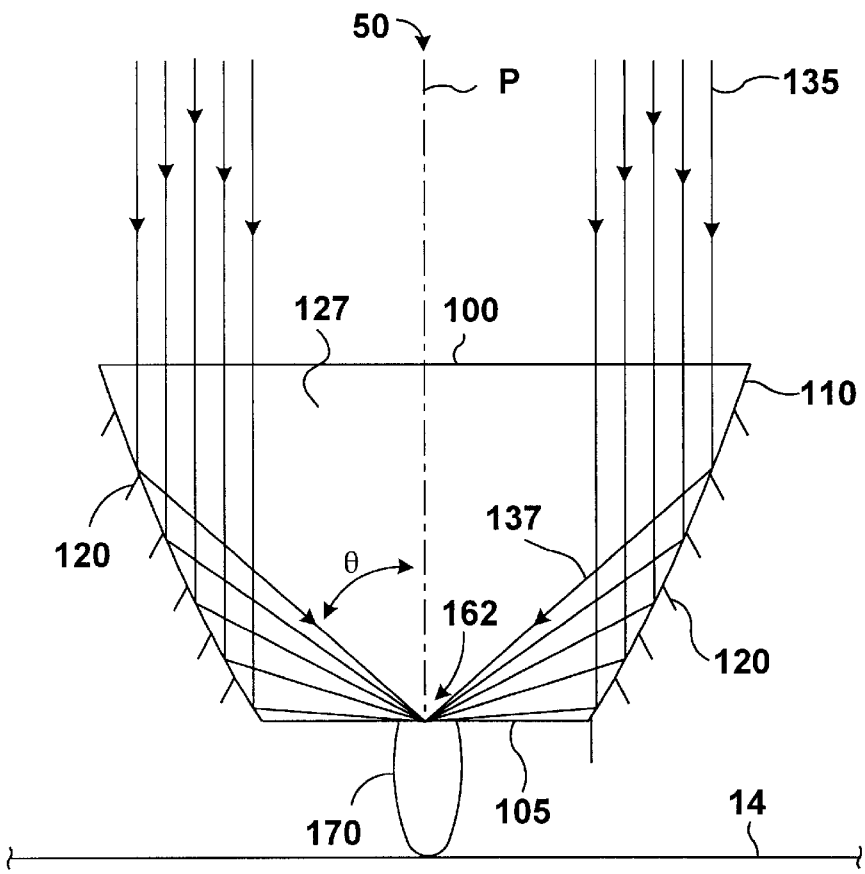
FIG. 3 is an enlarged, schematic, side view of an optical focusing device according to a first embodiment of the present invention for use with data storage systems of FIGS. 1 and 2.

The head 35 is formed of a slider (or slider body) 47 which is secured to the free end of the load beam 36 by means of the flexure 40, and an optical focusing device (also referred to as near field lens) 50 which is secured to the slider 47. The head 35 further includes an optical beam delivery means, such as a waveguide or an optical fiber 48. Alternatively, the optical beam can be delivered through free space. A stationary or a micro-machined dynamic mirror (or another reflective surface) 49 with wires 49W, can be secured to a trailing edge 55 of the slider 47 at a 45 degree angle relative to the optical beam emanating from the fiber 48, so as to reflect the optical beam onto the focusing device 50, in order to transduce data to and from a storage medium 14 (FIG. 3).

Though an exemplary the slider 47 will be described herein for illustration purpose only, it should be clear that other conventional or suitable sliders can be used. In the present illustration, the slider 47 includes a fiber channel 61 (FIG. 2) for receiving the optical fiber 48. Though the fiber channel 61 is illustrated as being centrally located along a generally central axis of the slider 47, it should be understood that the location of the fiber channel 61 can be offset relative to a central axis of symmetry of the slider 47. In a design where the optical beam is delivered through free space, for example when a fiber is not used, the optical beam can be transmitted through the fiber channel 61 or a waveguide formed within the fiber channel 61.

Figure 4:
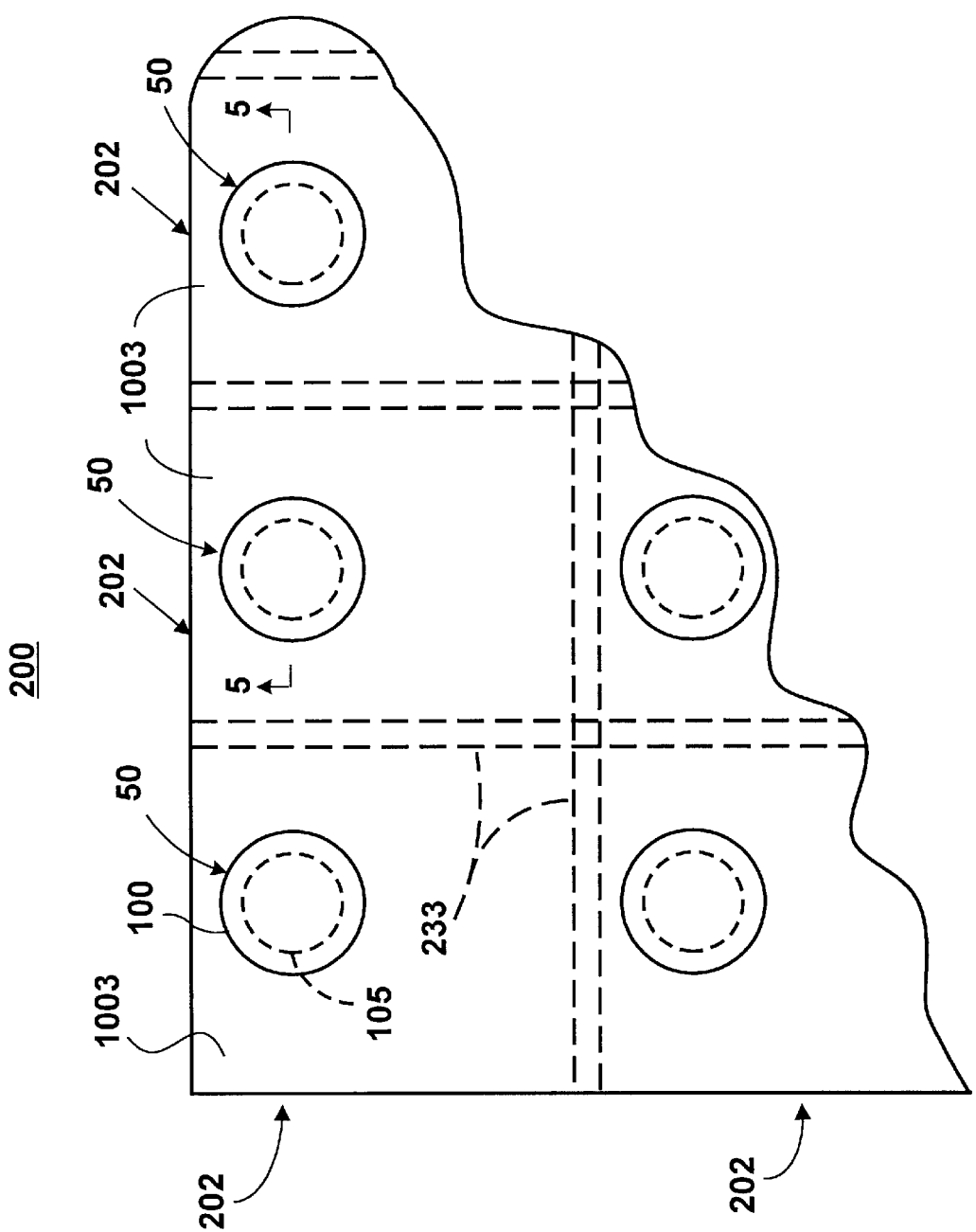
FIG. 4 is a top plan view of an optical substrate illustrating the batch or wafer level production of the optical focusing devices.

The details of the focusing device 50 will now be described with reference to FIGS. 3 through 5. The focusing device 50 is optically transmissive, and is defined by an incident surface 100, a bottom surface 105, and a reflective side 110. The incident surface 100 is generally flat, and has a preferably circular shape (FIG. 4). It should be clear that other shapes can be selected depending on the desired application of the focusing device 50. The bottom surface 105 is disposed opposite and parallel to the incident surface 100, and is similarly generally flat, circularly shaped, and optically transparent. According to one embodiment, the side 110 is parabola shaped, and is coated with a reflective layer 120.

In a data writing mode, an incident optical beam such as a collimated laser beam 135, impinges upon the incident surface 100 and passes through an optically transmissive body 127 of the focusing device 50, onto the side 110. The laser beam 135 is then reflected by the side 110 as a focused beam 137 through the body 127 onto the bottom surface 105. The focused beam 137 impinges upon the bottom surface 105 at a focal spot 162, as a very small sized spot. In a preferred embodiment, the focal spot 162 is located along a central axis P, in very close proximity to the disk 14, such that a localized evanescent field or light 170 interacts with the disk 14, for enabling data to be transduced to and from the disk 14 by effecting near field coupling. An electromagnetic coil or coil assembly (not shown), can be formed on the bottom surface 105, co-axially with the focal spot 162, for generating a desired write magnetic field.

The focused beam 137 defines an angle of incidence θ with the central axis P. It should be clear that the angle of incidence θ is greater than the angle of incidence had the optical beam 135 not undergone reflection by the side 110. Consequently, the NA of the focusing device 50 exceeds that of a conventional objective lens, as supported by the following equation:

$$NA = n . \sin θ,$$

where n is the index of refraction of the focusing device 50. It is therefore possible to select the lens body 127 of a material with a high index of refraction n, in order to increase the NA of the focusing device 50.

Using the present focusing device 50, it is possible to reduce the spot size on the disk 14 to less than 0.3 micron. The focusing device 50 can be made of any suitable transparent material, including but not limited to glass, crystal, plastic, a combination thereof and so forth.

The method of manufacturing the focusing device 50 will now be described in relation to FIGS. 4 and 5. The focusing device 50 can be made using molding, etching, or other suitable manufacturing techniques. The flatness of the incident surface 100 and the bottom surface 105 help facilitate the use of wafer processing in the mass production of the focusing device 50. Though each focusing device 50 can be formed individually, such as by molding, it would be more efficient and economical to mass produce the focusing devices 50 in batches, at wafer level.

FIG. 4 illustrates an optical wafer 200 on which a plurality of substantially identical lens plates 202 are formed. Each lens plate 202 contains a focusing device 50. The wafer 200 can be a flat glass (or silicon) sheet which is etched, molded, or pressed. Preferably, and as illustrated in FIG. 5, the optical wafer 200 is made by etching away openings 215. Each opening 215 extends through the entire height of the wafer 200, and is contoured by a wall 220 having a desired shape that simulates the shape of the side 110. In this illustration, the wall 220 is substantially parabola shape.

The interior of the wall 220 is then coated with a reflective layer or coating 120 which is made for example of aluminum, silver, or gold. The rest of the opening 215 is then filled with a suitable optical material such as high index glass to form the body 127 of the focusing device 50. The top and bottom surfaces 216, 217, respectively of the optical wafer 200 are lapped to the desired dimensions. In one embodiment, the overall height "H" of focusing device 50 ranges between approximately 200 microns and approximately 600 microns. The diameter or width "D" of the incident surface 100 ranges between approximately 300 microns and approximately 600 microns. The diameter or width "d" of the bottom surface 105 ranges between approximately 200 microns and approximately 400 microns.

Figure 5:
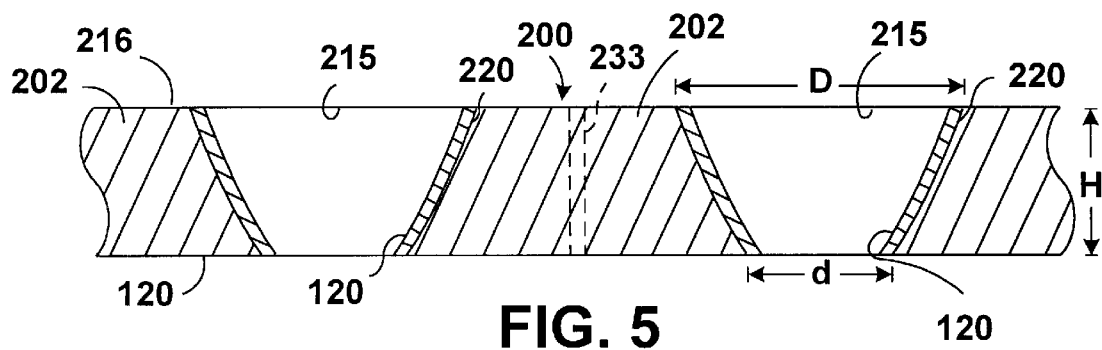
FIG. 5 is a cross sectional view of the optical substrate of FIG. 4 along line 5—5.

The optical wafer 200 is sliced into individual lens plates 202, along lines 233 (shown in dashed lines in FIG. 5). The lens plate 202 facilitates the handling of the focusing device 50 and its assembly to the slider body 47.

Figure 6:
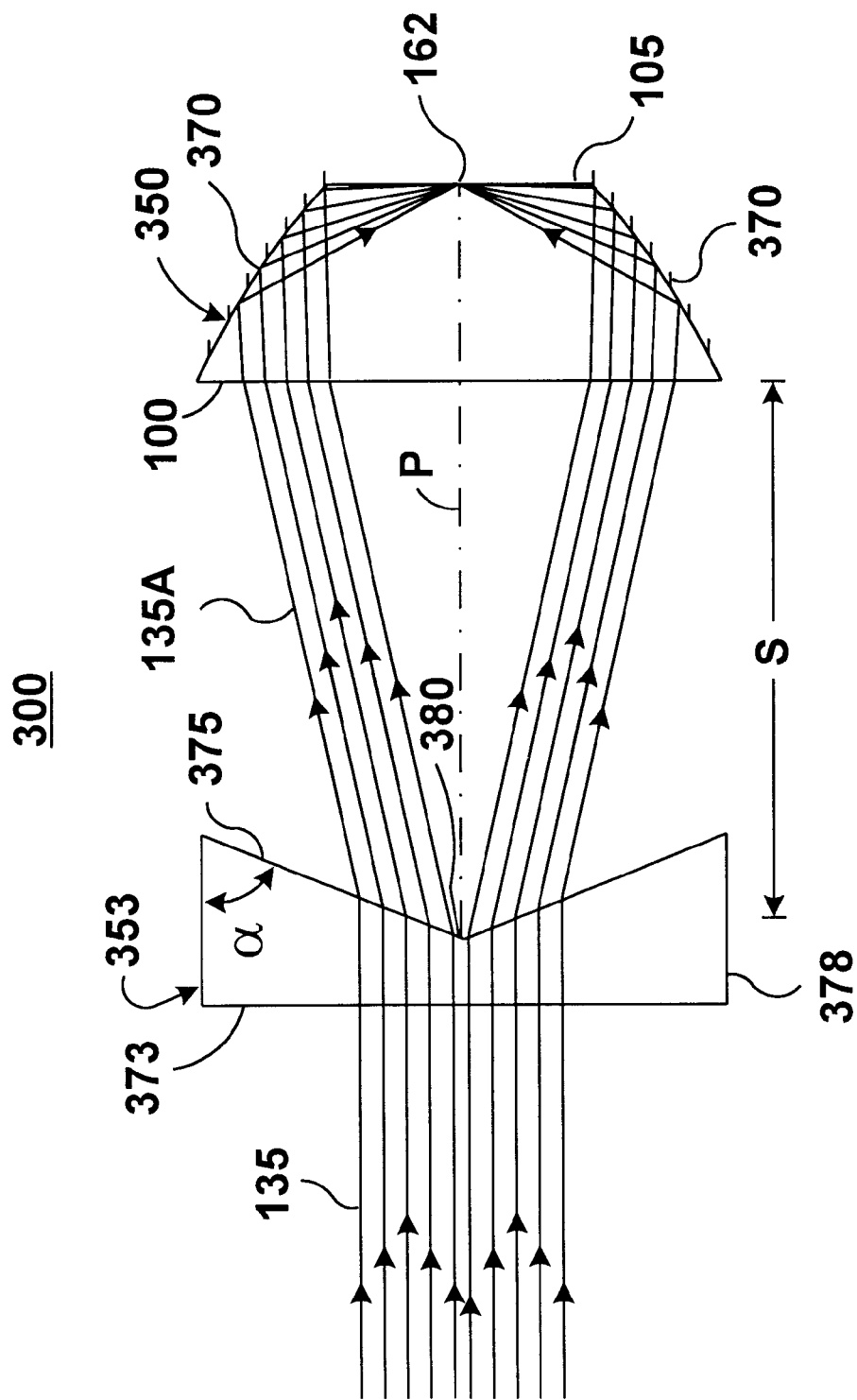
FIG. 6 is a side view of another optical focusing device according to the present invention.

FIG. 6 illustrates another focusing device 300 according to the present invention. The focusing device 300 is comprised of a focusing device 350 and a complementary conical element 353. The focusing device 350 is generally similar in function and design to the focusing device 50 of FIG. 3, and includes an incident surface 100, a bottom surface 195 and a side 370.

The side 370 is generally similar in function and design to the side 110 of the focusing device 50. According to one embodiment, the side 370 is parabola shaped. According to another embodiment the curvature of the side 370 has a tilted parabola shape which is expressed, for example, by the following equation:

$$Z = -ctg\ θ · ρ + \frac{2f · \cos θ}{\sin^2 θ} - \frac{2f}{\sin^2 θ} \sqrt{1 - \frac{\sin θ}{f} · ρ},$$

where θ is the rotation angle of the parabola curve; f is the focus length of the parabola; and ρ is the cylindrical radius (i.e., the distance to the central axis P).

The tilted parabola curvature is selected to cancel or compensate for the first (and/or other) order conical term or terms introduced by the conical element 353. The tilted parabola curvature further provides tight focus of the incoming optical beam.

The conical element 353 is optically transmissive, and includes a flat incident surface 373, a conical exit surface 375, and a cylindrical side 378 with a circular cross-section. The conical element 353 is disposed at a distance "S" from the focusing device 350, wherein the distance "S" is measured from the apex 380 of the exit surface 375 and the incident surface 100 of the focusing device 350. The apex 380 is preferably aligned along the central axis P and the focal spot 162. In one embodiment, the distance "S" ranges between approximately 200 microns and approximately 500 microns.

The cone angle "α" of the exit surface 375 is defined between the exit surface 375 and the central axis "P". In one embodiment, the cone angle "α" ranges between approximately 40 degrees and approximately 80 degrees. Other values of the distance "S" and the cone angle "α" can vary with the desired applications.

In a data writing mode, an incident optical beam such as the collimated laser beam 135, impinges upon the incident surface 373 and passes through the body of the conical element 353 for impinging onto the conical exit surface 375. The exit surface 373 refracts the incident beam 135 into a divergent beam 135A that impinges upon the incident surface 100 of the focusing device 350. The divergent beam 135A passes through the optically transmissive body of the focusing device 50, onto the side 370, and is reflected thereby as a focused beam onto the bottom surface 105 at the focal spot 162. Among the advantages of the focusing device 300 are: (1) The focusing device 300 has a high NA that translates into a small spot size; and (2) the focusing device 300 offers high optical efficiency. This design offers a high numerical aperture (NA) and ease of manufacture.

Figure 7:
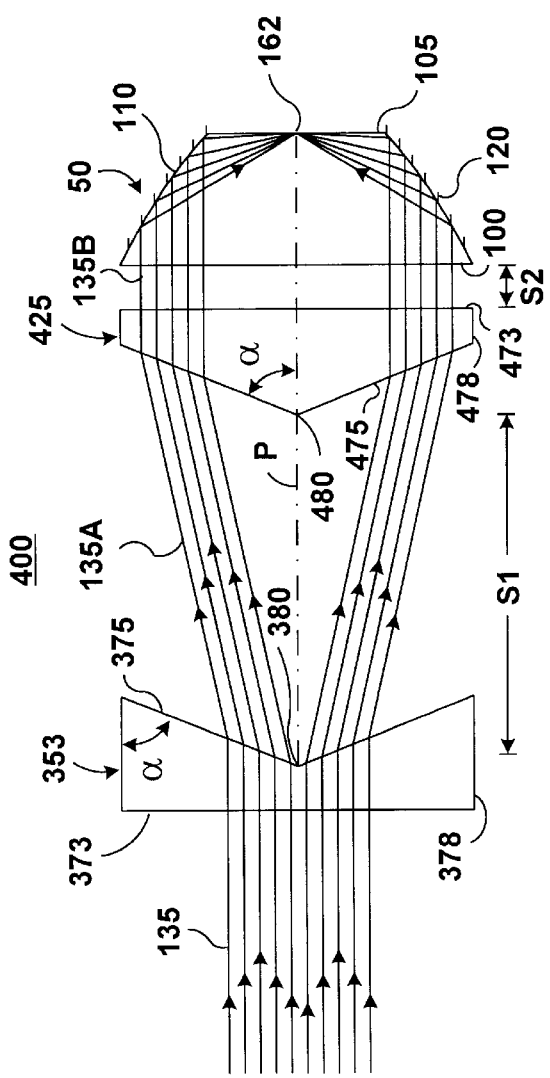
FIG. 7 is a side view of yet another optical focusing device according to the present invention comprised of three complementary components.

FIG. 7 illustrates another focusing device 400 according to the present invention. The focusing device 400 is comprised of the focusing device 50 (FIG. 3), the conical element 353 (FIG. 6), and a complementary conical element 425 disposed intermediate the focusing device 50 and the conical element 353. In another embodiment, the focusing device 50 can be replaced with the focusing device 350 (FIG. 6) or another suitable focusing device or lens.

The complementary conical element 425 is optically transmissive and includes an incident conical surface 475, a flat exit surface 473, and a cylindrical side 478 with a circular cross-section. The conical element 475 is disposed at a distance "S1" from the complementary conical exit surface 375 of the conical element 353. The distance "S1" is measured from the apex 380 of the exit surface 375 of the conical element 353, and the apex 480 of the conical incident surface 475 of the complementary conical element 425. In one embodiment, the distance "S1" ranges approximately 200 microns and approximately 500 microns. The apices 380 and 480 are preferably disposed colinearly with the focal spot 162, along the central axis P.

Figure 7A:
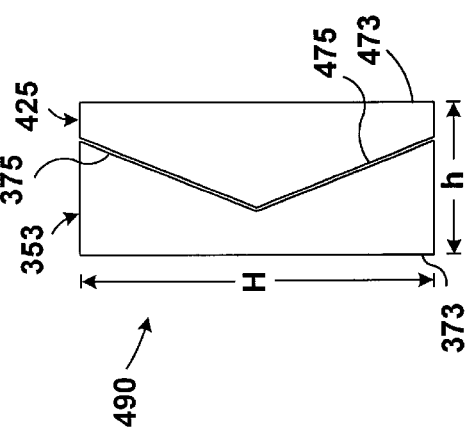
FIG. 7A is a side view of two conical elements forming part of the focusing device of FIG. 7, shown mated to form an axicon.

The cone angle "α" of the incident surface 475 is defined between the incident surface 475 and the central axis "P". The cone angle "α" of the incident surface 475 is the same as the cone angle "α" of the exit surface 375, so that the exit surface 375 and the incident surface 475 are complementary. In other terms, if both conical elements 353 and 425 were fitted together, as illustrated in FIG. 7A, the exit surface 375 and the incident surface 475 will mate to form a cylindrical axicon whose diameter "H" ranges approximately 200 microns and approximately 500 microns, and whose height "h" ranges between approximately 50 microns and approximately 300 microns. It should be clear that other dimensions can alternatively be selected depending on the desired application.

The flat incident surface 373 of the conical element 353 and the flat exit surface 473 of the complementary conical element 425 are parallel. The exit surface 473 of the complementary conical element 425 is separated from the incident surface 100 of the focusing device 50 by a distance "S2". The distance "S2" can be selected between approximately 10 microns and approximately 100 microns, and the cone angle "α" can be selected between approximately 40 degrees and approximately 80 degrees.

In a data writing mode, an incident optical beam such as the collimated laser beam 135, impinges upon the incident surface 373 and passes through the body of the conical element 353 for impinging onto the conical exit surface 375. The exit surface 375 refracts the incident beam 135 into a divergent beam 135A, which, in turn, impinges upon the incident surface 475 of the complementary conical element 425.

In this embodiment, the index of refraction (n) of the conical element 353 matches that, or is the same as the index of refraction of the complementary conical element 425. As a result, the divergent beam 135A is refracted by the complementary conical element 425 into a collimated cylindrical beam 135B. In turn, the collimated beam 135B impinges upon the side 110 of the focusing device 50 for reflection thereby as a focused beam onto the bottom surface 105 at the focal spot 162.

Figure 8:
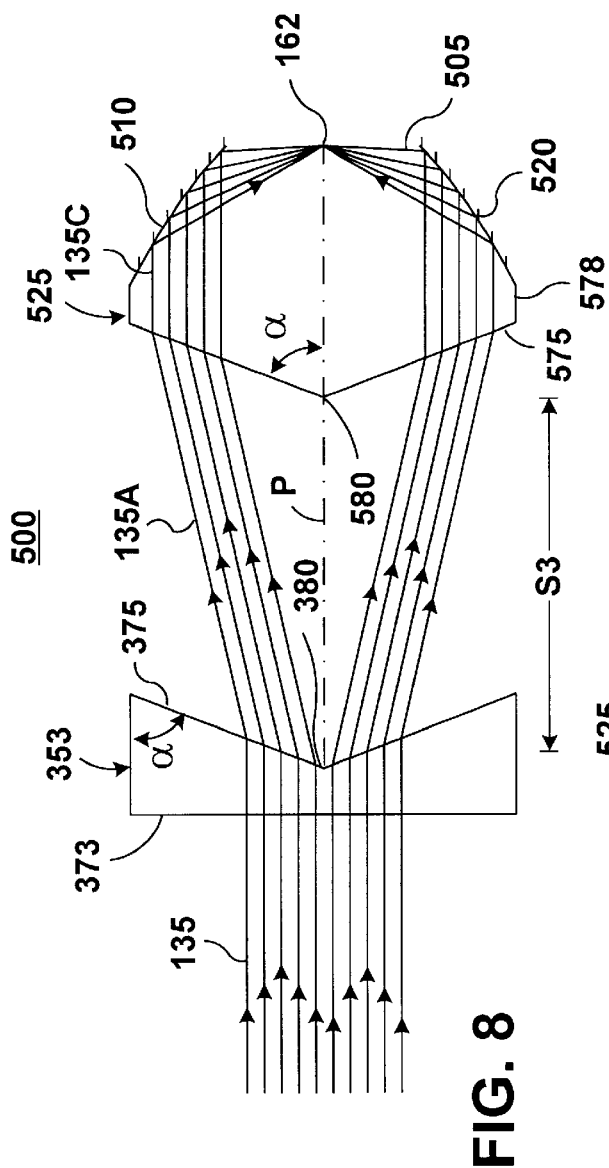
FIG. 8 is a side view of a still another optical focusing device according to the present invention comprised of two complementary components.

FIG. 8 illustrates another focusing device 500 according to the present invention. The focusing device 500 is comprised of the conical element 353 (FIGS. 6, 7) and a complementary conical element 525. The complementary conical element 525 is optically transmissive and includes an incident conical surface 575, a cylindrical side 578 with a circular cross-section, a side 510 with a parabolic curvature, and a flat bottom surface 505.

The conical element 353 is disposed at a distance "S3" from the complementary conical element 525. The distance "S3" is measured from the apex 380 of the exit surface 375 of the conical element 353 and the apex 580 of the conical incident surface 575 of the complementary conical element 525. In one embodiment, the distance "S3" ranges between approximately 200 microns and approximately 500 microns. The apices 380 and 580 are preferably disposed colinearly with the focal spot 162, along the central axis P.

The cone angle "α" of the incident surface 575 is defined between the incident surface 575 and the central axis "P". The cone angle "α" of the incident surface 575 is the same as the cone angle "α" of the exit surface 375, so that the exit surface 375 and the incident surface 575 are complementary. In other terms, if both conical elements 353 and 525 were fitted together, the exit surface 375 and the incident surface 575 will mate with tight accuracy.

Figure 8A:
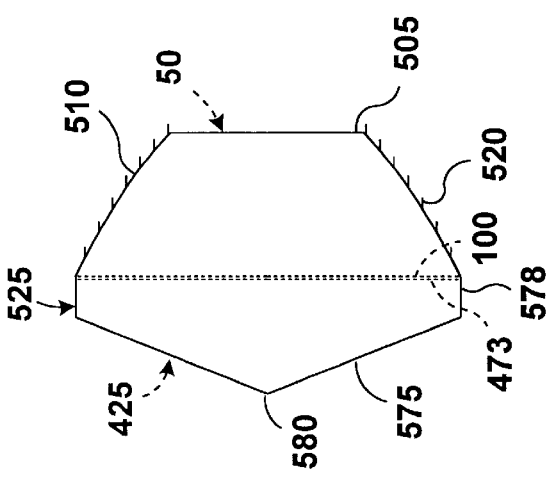
FIG. 8A is a side view of a complementary conical element forming part of the focusing device of FIG. 8.

FIG. 8A further illustrates the complementary conical element 525 as being formed of the complementary conical element 425 (FIG. 7) and the conical focusing device 50 (FIGS. 3, 7). The interface surfaces of the complementary conical element 425 and the conical focusing device 50 are shown outlined by two dashed lines. While the complementary conical element 525 is illustrated as being integral (i.e., made of a single piece), it should be clear that the complementary conical element 525 can be formed of the combination of both the complementary conical element 425 and the conical focusing device 50, in essence reducing the separation distance S2 (FIG. 7) to zero or close to zero.

The separation distance "S3" and the cone angle "α" are selected such that all or substantially all the rays of the laser beam 135 are reflected and focused by the side 510.

In a data writing mode, an incident optical beam such as the collimated laser beam 135, impinges upon the incident surface 373 and passes through the body of the conical element 353 for impinging onto the conical exit surface 375. The exit surface 373 refracts the incident beam 135 into a divergent beam 135A, which, in turn, impinges upon the incident surface 575 of the complementary conical element 525.

In this embodiment, the index of refraction (n) of the conical element 353 matches that, or is the same as the index of refraction of the complementary conical element 525. As a result, the divergent beam 135A is refracted by the complementary conical element 525 into a collimated cylindrical beam 135C that impinges upon the parabolic side 510 of the complementary conical element 525 for reflection thereby as a focused beam onto the bottom surface 505 at the focal spot 162.

In the embodiment illustrated in FIG. 8A, the conical incident surface 575 and its apex 580 correspond to the conical incident surface 475 and the apex 480 of the complementary conical element 425, respectively. The cylindrical side 578 corresponds to the cylindrical side 478 of the complementary conical element 425. The side 510 and the bottom surface 505 correspond to the side 110 and the bottom surface 105, respectively of the focusing device 50.

Figure 9:
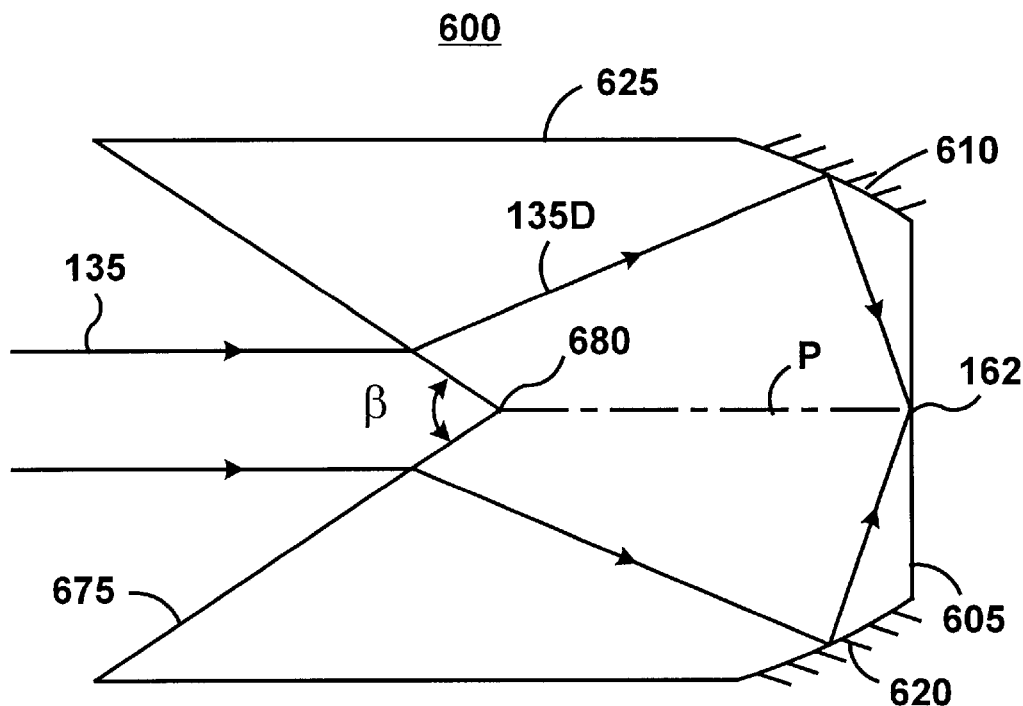
FIG. 9 is a side view of a fifth optical focusing device according to the present invention.

FIG. 9 illustrates yet another focusing device 600 according to the present invention. The focusing device 600 is optically transmissive, integrally formed, and comprised of an incident symmetric conical surface 675, a cylindrical side 625 with a circular cross-section, a tilted parabolic side 610 coated with a reflective layer 620, and a flat bottom surface 605.

The cone angle "β" of the incident surface 675 ranges between approximately 40 degrees and approximately 80 degrees. It should be clear that other values can alternatively be selected. The apex 680 of the incident surface 675 is preferably disposed colinearly with the focal spot 162, along the central axis P.

In a data writing mode, a collimated laser beam 135 impinges upon the incident surface 675 and is refracted thereby into a divergent beam 135D. The beam 135D passes through the transmissive body of the focusing device 600 and impinges onto the reflective tilted parabolic side 610, for reflection thereby as a focused beam onto the bottom surface 605 at the focal spot 162.

Figure 10:
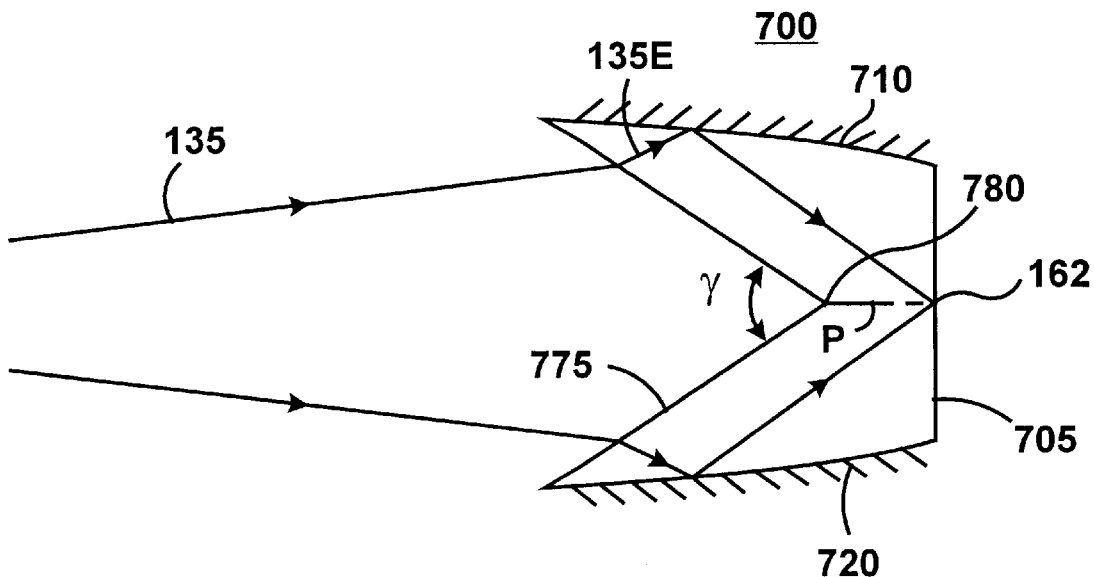
FIG. 10 is a side view of a sixth optical focusing device according to the present invention for use with a divergent beam, such as a beam emanating from an optical fiber.

FIG. 10 illustrates still another focusing device 700 according to the present invention. The focusing device 700 is optically transmissive, integrally formed, and comprised of an incident symmetric conical surface 775, a tilted parabola side 710 coated with a reflective layer 720, and a flat bottom surface 705.

The cone angle "γ" of the incident surface 775 ranges between approximately 40 degrees and approximately 80 degrees. It should be clear that other values can alternatively be selected. The apex 780 of the incident surface 775 is preferably disposed colinearly with the focal spot 162, along the central axis P.

In a data writing mode, a divergent laser beam 135 impinges upon the incident surface 775 and is refracted thereby into another divergent beam 135E. The beam 135E passes through the transmissive body of the focusing device 700 and impinges onto the reflective tilted parabolic side 710, for reflection thereby as a focused beam onto the bottom surface 705 at the focal spot 162.

It should also be understood that the geometry, compositions, and dimensions of the elements described herein can be modified within the scope of the invention and are not intended to be the exclusive. Other modifications can be made when implementing the invention for a particular environment. The use of the focusing device is not limited to data storage devices, as it can be used in various other optical applications, including but not limited to high resolution microscopy, surface inspection, and medical imaging.

What is claimed is:

1. An optical device for focusing an incident optical beam to a focal spot, comprising:
    an optically transmissive body defined by:
        a generally flat incident surface;
        a generally flat, bottom surface disposed opposite and parallel to said incident surface; and
        a reflective side coated, at least in part, with a reflective layer, for reflecting the optical beam through said body toward said bottom surface; and
    wherein said bottom surface defines a focal plane on which the focal spot is formed, for generating an evanescent field.

2. An optical device according to claim 1, wherein said side has a parabola shaped curvature.

3. An optical device according to claim 1, wherein said side has a tilted parabola shaped curvature.

4. An optical device according to claim 1, wherein said incident surface is generally circularly shapes.

5. An optical device according to claim 1, wherein said bottom surface is generally circularly shaped.

6. An optical device according to claim 1 having a central axis, wherein the focal spot is located along said central axis P.

7. An optical device according to claim 1, wherein a coil assembly is formed on said bottom surface, co-axially with the focal spot, for generating a write magnetic field.

8. An optical device according to claim 1, wherein said side reflects the optical beam as a focused beam through said body toward said bottom surface;
    wherein the focused beam defines an angle of incidence θ with a central axis; and
    wherein said angle of incidence determines a numerical aperture (NA) according to the following equation:

$$NA = n \cdot \sin \theta,$$

where n is an index of refraction of said body.

9. An optical device according to claim 1, wherein said body is made of any of: glass, crystal, plastic, or a combination thereof.

10. An optical device according to claim 1, further including a complementary conical element.

11. An optical device according to claim 10, wherein said complementary conical element is optically transmissive, and includes a generally flat incident surface and a conical exit surface.

12. An optical device according to claim 11, further wherein said complementary conical element further includes a cylindrical side having a circular cross-section.

13. An optical device according to claim 11, wherein said conical exit surface includes an apex; and
    wherein said apex is aligned along a central axis and the focal spot.

14. An optical device according to claim 11, further including a second complementary conical element disposed intermediate said body and said complementary conical element.

15. An optical device according to claim 14, wherein said second complementary conical element is optically transmissive and includes an incident conical surface, and a flat exit surface; and
    wherein said conical exit surface of said complementary conical element and said incident conical surface of said second complementary conical element are fitted together to form a cylindrical axicon.

16. An optical device according to claim 15, wherein said complementary conical element and said second complementary conical element are disposed distally from each other.

17. An optical device according to claim 16, wherein said second complementary conical element and said body are disposed distally from each other.

18. An optical device according to claim 17, wherein said complementary conical element has an apex;
    wherein said second complementary conical element has an apex; and
    wherein said apices are disposed colinearly along a central axis.

19. An optical device for focusing an incident optical beam to a focal spot, comprising:
    a conical element; and
    a complementary element having an optically transmissive body defined by:
        a conically shaped incident surface;
        a generally flat bottom surface disposed opposite to said incident surface;
        a cylindrical side with a circular cross-section;
        a reflective side coated, at least in part, with a reflective layer, for reflecting the optical beam through said body toward said bottom surface; and wherein said bottom surface defines a focal plane on which the focal spot is formed, for generating an evanescent field.

20. An optical device according to claim 19, wherein said conical element is disposed at a distance relative to said complementary element.

21. An optical device for focusing an incident optical beam to a focal spot, comprising:
    an optically transmissive body defined by:
        an incident conical surface;
        a generally flat bottom surface disposed opposite to said incident surface;
        a reflective side coated, at least in part, with a reflective layer, for reflecting the optical beam through said body toward said bottom surface; and
    wherein said bottom surface defines a focal plane on which the focal spot is formed, for generating an evanescent field.

22. An optical device according to claim 21, further including a cylindrical side with a circular cross-section.

23. A method of making an optical device having an optically transmissive body is defined by a generally flat incident surface, a generally flat, a bottom surface, and a reflective side coated, at least in part, with a reflective layer, comprising:

forming a plurality of substantially identical lens plates on an optical wafer wherein each lens plate contains at least one focusing device; and said step of forming includes:
    etching a plurality of openings in said optical wafer, wherein each opening corresponds to one optical device; wherein each opening extends through the entire height of said optical wafer; and wherein each opening is contoured by a wall having the shape of the reflective side;
    coating at least part of said interior surface of said wall with a reflective layer; and
    filling said opening with an optical material.

24. A method according to claim 23, further including a top surface and a bottom surface of said optical wafer to a desired height.

25. A method according to claim 24, further including slicing said optical wafer into individual lens plates along cutting lines.

* * * * *